United States Patent [19]

Kawata et al.

[11] Patent Number: 4,739,011
[45] Date of Patent: Apr. 19, 1988

[54] THERMOPLASTIC RESIN COMPOSITION

[75] Inventors: Takashi Kawata, Mie; Yoshitaka Matsuo, Yokkaichi; Kenya Makino, Kuwana; Noboru Oshima, Suzuka, all of Japan

[73] Assignee: Japan Synthetic Rubber Co., Ltd., Tokyo, Japan

[21] Appl. No.: 49,337

[22] Filed: May 13, 1987

[30] Foreign Application Priority Data

Jun. 6, 1986 [JP] Japan ................. 61-131345

[51] Int. Cl.4 .............. C08L 23/26; C08L 51/06
[52] U.S. Cl. ........................ 525/73; 525/74; 525/77; 525/78
[58] Field of Search ............... 525/74, 78, 73, 77

[56] References Cited

U.S. PATENT DOCUMENTS

| | | | |
|---|---|---|---|
| 3,862,265 | 1/1975 | Stienkamp et al. | 525/74 |
| 3,868,433 | 2/1975 | Bartz et al. | 525/193 |
| 3,882,194 | 5/1975 | Krebaum et al. | 525/74 |
| 4,368,280 | 1/1983 | Yui et al. | 524/515 |
| 4,397,992 | 8/1983 | Johanson et al. | 524/534 |
| 4,612,155 | 9/1986 | Wong et al. | 525/78 |
| 4,678,834 | 7/1987 | Boivin et al. | 525/74 |

Primary Examiner—Carman J. Seccuro
Attorney, Agent, or Firm—Oblon, Fisher, Spivak, McClelland & Maier

[57] ABSTRACT

A thermoplastic resin composition obtainable by blending 100 parts by weight of a mixture consisting of
(A) 75 to 40% by weight of a propylene polymer,
(B) 20 to 40% by weight of an ethylene-alpha-olefin copolymer, and
(C) 5 to 30% by weight of a graft copolymer obtained by copolymerizing an aromatic vinyl compound and a polar vinyl compound in the presence of an ethylene-alpha-olefin copolymer with
(D) 0.1 to 5 parts by weight of an unsaturated dicarboxylic acid, an anhydride thereof or a mixture of the two, and
(E) 0.01 to 0.3 part by weight of an organic radical-generating agent, and then subjecting the resulting blend to thermal treatment. Said composition has not only a high bending modulus inherently possessed by polypropylene resins but also remarkably improved coating property. Accordingly, the composition is useful as interior and exterior trim parts of automobiles and exterior trim parts of motorcycles.

15 Claims, No Drawings

THERMOPLASTIC RESIN COMPOSITION

This invention relates to a thermoplastic resin composition useful as interior and exterior trim parts of automobiles, housing components of electric applicances, etc. More particularly, this invention relates to a thermoplastic resin composition having excellent coating property and excellent bending modulus.

Polypropylene resins, having excellent mechanical properties, excellent chemical resistance and good moldability, have been widely used in various applications. However, they are inferior in coating property.

For improving the coating property of polypropylene resins, various methods are known in which a polypropylene resin is thermally treated together with a carboxyl, hydroxyl or epoxy group-containing unsaturated compound in the presence of an organic radical-generating agent [See Japanese Patent Application Kokai (Laid-Open) Nos. 154,732/83, 173,135/83, 191,706/83 and 99,148/85].

These methods for improving the coating property of polypropylene resins are, however, disadvantageous in that the mechanical properties (e.g. bending modulus) which are features of polypropylene resins are deteriorated, and hence, these methods are not necessarily practical.

In view of the above-mentioned technical problem of the prior art, the present inventors have made extensive research in order to remarkably improve the coating property of polypropylene resins while minimizing the reduction of their bending modulus. As a result, the present inventors have found that a thermoplastic resin composition having a high bending modulus and being excellent in paint adhesiveness can be obtained by blending a mixture consisting of 75 to 40% by weight of a propylene polymer, 20 to 40% by weight of an ethylene-alpha-olefin copolymer and 5 to 30% by weight of a graft copolymer, with a specific amount of an unsaturated dicarboxylic acid and/or an anhydride thereof and a specific amount of an organic radical-generating agent and then subjecting the resulting blend to thermal treatment.

An object of this invention is to provide a thermoplastic resin composition having not only a high bending modulus inherently possessed by polypropylene resins but also an improved coating property.

Other objects and advantages of this invention will become apparent from the following description.

According to this invention, there is provided a thermoplastic resin composition obtainable by blending 100 parts by weight of a mixture consisting of (A) 75 to 40% by weight of a propylene polymer,
(B) 20 to 40% by weight of an ethylene-alpha-olefin copolymer, and
(C) 5 to 30% by weight of a graft copolymer obtained by copolymerizing an aromatic vinyl compound and a polar vinyl compound in the presence of an ethylene-alpha-olefin copolymer, with (D) 0.1 to 5 parts by weight of an unsaturated dicarboxylic acid and/or an anhydride thereof, and
(E) 0.01 to 0.3 part by weight of an organic radical-generating agent, and then subjecting the resulting blend to thermal treatment.

The propylene polymer (A) used in this invention includes crystalline homopolymers of propylene and crystalline propylene-ethylene copolymers having an ethylene content of at most 25% by weight. The copolymers are preferred.

In the ethylene-alpha-olefin copolymer (B) of this invention, the alpha-olefin used as a copolymer is an alpha-olefin having 3 to 12 carbon atoms and includes specifically propylene, butene-1, 4-methyl-pentene-1, hexene-1, octene-1, etc. Propylene is preferred. These alpha-olefins can be used alone or in admixture of two or more.

The ethylene-alpha-olefin copolymer (B) may further have a non-conjugated diene compound copolymerized therewith. However, the absence of such a non-conjugated diene compound is preferred.

In the ethylene-alpha-olefin copolymer (B) used in this invention, the weight ratio of ethylene/an alphaolefin/an optionally used non-conjugated diene compound is preferably 0.2-0.8/0.2-0.8/0-0.1, more preferably 0.2-0.7/0.2-0.7/0-0.5. The Mooney viscosity ($ML_{1+4}$, 100° C.) of the ethylene-alpha-olefin copolymer (B) is preferably 5 to 150, more preferably 10 to 70.

When said Mooney viscosity is less than 5, the resulting thermoplastic resin composition is, in some cases, insufficient in mechanical strengths, a representative of which is bending modulus. When the Mooney viscosity exceeds 150, the resulting thermoplastic resin composition is, in some cases, inferior in processability, for example, the flowability in injection molding is reduced.

The graft copolymer (C) used in this invention is obtained by subjecting at least one aromatic vinyl compound and at least one polar vinyl compound to co-graft polymerization in the presence of an ethylene-alpha-olefin copolymer, representives of which are an ethylene-propylene copolymer (EPM), an ethylene-propylene-non-conjugated diene copolymer (EPDM) and the like. The aromatic vinyl compound includes styrene, alpha-methylstyrene, ringsubstituted styrenes, etc. The polar vinyl compound includes acrylonitrile and its derivatives; methacrylic acid; methacrylic acid esters such as methyl methacrylate, ethyl methacrylate and the like; acrylic acid; acrylic acid esters such as methyl acrylate, ethyl acrylate, butyl acrylate and the like; acrylamide; methacrylamide; vinyl ethers such as methyl vinyl ether and the like; vinyl ketones such as methyl vinyl ketone and the like; vinylpyridine; and vinyl esters such as vinyl acetate and the like. A combination of styrene and acrylonitrile is preferred. A combination of 80 to 60% by weight of styrene and 20 to 40% by weight of acrylonitrile, and a combination of this combination with a small amount of a third monomer are particularly preferred.

The graft polymerization method is not critical and the graft polymerization can be effected according to a conventional method. Generally known are, for example, a method wherein the above monomers are emulsion-polymerized in the presence of an EPM latex and/or an EPDM latex and a method wherein an EPM and/or an EPDM is dissolved in a solvent or a monomer, the above monomers are added to the resulting solution, and the whole mixture is subjected to solution polymerization. The polymerization conditions may be those known to the art. The rubber content in the graft copolymer is preferably 20 to 70% by weight. The non-conjugated diene compound in EPDM may be any known non-conjugated diene compound. 5-Ethylidene-2-nobornene, cyclopentadiene and 1,4-hexadiene are particularly preferred.

The unsaturated dicarboxylic acid and/or the anhydride thereof (D) used in this invention is an alpha, beta-unsaturated dicarboxylic acid and/or an anhydride thereof. Specific examples thereof include maleic acid, itaconic acid, citraconic acid, nadic acid, maleic anhydride, itaconic anhydride, citraconic anhydride, nadic anhydride and the like. Maleic anhydride is particularly preferred.

The organic radical-generating agent (E) used in this invention includes 2,5-dimethyl-2,5-di(t-butylperoxy)-hexyne-3, 2,5-dimethyl-2,5-di(t-butylperoxy)hexane, 1,3-bis(t-butylperoxyisopropyl)benzene, 2,2-bis(t-butylperoxy)-p-diisopropylbenzene, dicumyl peroxide, di-t-butyl peroxide, t-butyl benzoate, 1,1-bis(t-butylperoxy)-3,3,5-trimethylcyclohexane, 2,4-dichlorobenzoyl peroxide, benzoyl peroxide, azobisisobutyronitrile and the like. Preferred are 2,5-dimethyl-2,5-di(t-butylperoxy)-hexane, 1,3-bis(t-butylperoxyisopropyl)benzene and 2,2-bis-(t-butylperoxy)-p-diisopropylbenzene.

The thermoplastic resin composition of this invention can be obtained by adding (D) 0.1 to 5 parts by weight, preferably 0.5 to 3 parts by weight, of an unsaturated dicarboxylic acid and/or an anhydride thereof and (E) 0.01 to 0.3 part by weight, preferably 0.05 to 0.2 part by weight, of an organic radical-generating agent to 100 parts by weight of a mixture consisting of (A) 75 to 40% by weight, preferably 70 to 50% by weight of a propylene polymer, (B) 20 to 40% by weight, preferably 25 to 35% by weight of an ethylene-alpha-olefin copolymer and (C) 5 to 30% by weight, preferably 10 to 25% by weight of a graft copolymer, and then subjecting the resulting mixture to thermal treatment in a mixer (e.g., a Banbury mixer, a kneader) or an extruder at 170° to 300° C., preferably 180° to 250° C., for 0.2 to 30 minutes, preferably 0.5 to 20 minutes.

The proportion of each component used in the above thermal treatment is critical. When the proportion of the propylene polymer (A) exceeds 75% by weight, the impact resistance becomes deteriorated, and hence, this proportion is not desirable. When the proportion is less than 40% by weight, the coating property is remarkably reduced, and hence, this proportion is also undesirable. When the proportion of the ethylene-alpha-olefin copolymer (B) exceeds 40% by weight, the bending modulus becomes remarkably low, and hence, this proportion is undesirable. When the proportion is less than 20% by weight, the impact resistance becomes inferior, and hence, this proportion is also undersirable. When the amount of the graft copolymer (C) exceeds 30% by weight, the coating property is greatly deteriorated, and hence, this proportion is undesirable. When the amount is less than 5% by weight, the bending modulus becomes low, and hence, this proportion is also undesirable. When the amount of the unsaturated dicarboxylic acid and/or the anhydride thereof (D) is less than 0.1 part by weight based on 100 parts by weight of the mixture of the components (A), (B) and (C), the coating property becomes inferior, and hence, this proportion is undesirable. When the amount exceeds 5 parts by weight on the same basis, a large amount of the unsaturated monomer remains in the resulting composition, and in some cases, a smooth surface to be coated is not obtained. This proportion is, therefore, undesirable. When the amount of the organic radical-generating agent (E) is less than 0.01 part by weight, the coating property becomes inferior, and hence, this proportion is undesirable. When the amount exceeds 0.3 part by weight, the bending modulus is, in some cases, greatly reduced, and hence, this proportion is also undesirable.

With respect to the conditions used for the thermal treatment, when the treatment temperature is less than 170° C., the propylene polymer does not completely melt in some cases, and hence, the components are not sufficiently mixed, failing to obtain a uniform composition. This is, therefore, undesirable. When the temperature exceeds 300° C., thermal degradation occurs, which is also undesirable. The treatment time may vary depending on the machine used in the thermal treatment, the treatment temperature and the decomposition temperature of the organic radical-generating agent. In general, when the treatment time is less than 0.2 minute, no sufficient mixing and dispersion takes place in many cases, and this is undesirable. When the treatment time exceeds 30 minutes, reduction in molecular weight of polymers due to kneading takes place in some cases, and this is also undesirable.

To the thermoplastic resin composition thus obtained can, if necessary, be added, before or after the thermal treatment, conventional additives such as an antioxidant, a thermal stabilizer, an ultraviolet absorber, a coloring agent and the like, as well as fillers such as calcium carbonate, kaolin, talc, asbestos, glass fiber, carbon fiber, aromatic polyamide fiber and the like. Articles made of the thermoplastic resin composition of this invention can be coated with a paint by subjecting the surface of such an article to etching treatment with a vapor of trichloroethylene, trichloroethane or the like and then applying a commercially available paint to the etched surface using a device such as an air gun or the like. Polyurethane type paints are particularly preferred for the composition of this invention.

The thermoplastic resin composition of this invention is usefully applied to interior and exterior trim parts of automobiles (e.g., bumper, spoiler, body, inner panel), exterior trim parts of motorcycles, and housing components of electric appliances. The thermoplastic resin composition of this invention is particularly useful when subjected to coating with a urethane type paint, particularly to topcoating without any primer treatment.

The present invention will be explained in more detail below referring to Examples, which are not by way of limitation but by way of illustration.

The physical properties shown in the following Examples were measured as follows:

(1) Peel strength

Coating property was evaluated using peel strength as index.

A resin sheet of 2 mm in thickness obtained by injection molding was degreased with ethanol and then treated with trichloroethane vapor. The thus treated sheet was coated with a polyurethane type paint (paint: R 263, curing agent: R 230, manufactured by Nippon Bee Chemical Co., Ltd.) in a thickness of 45±10 μm. The coated sheet was backed at 90° C. for 40 minutes and then allowed to stand for at least 48 hours. The coated and backed sheet subjected to measurement of peel strength at a peel angle of 90° and a peeling speed of 30 mm/min.

(2) Bending modulus

Measured in accordance with JIS K 7203.

EXAMPLE 1

With 60 parts by weight of a polypropylene (Noblen BC-4 (melt flow rate (230° C., 2160 g)=6.5 g/10 min;

ethylene content=about 5% by weight), manufactured by Mitsubishi Petrochemical Co., Ltd.) were premixed 30 parts by weight of an ethylene-propylene rubber (JSR EP02P (Mooney viscosity (ML$_{1+4}$, 100° C.)=24; propylene content=26% by weight), manufactured by Japan Synthetic Rubber Co., Ltd.), 10 parts by weight of a graft copolymer (styrene-acrylonitrile-grafted EPDM, JSR AES110 (melt flow rate (220° C., 10 kg)=17 g/10 min; specific gravity=1.03), manufactured by Japan Synthetic Rubber Co., Ltd.), 1 part by weight of maleic anhydride (guarantee grade, ground in a mortar) and 0.1 part by weight of 2,5-di-methyl-2,5-di(t-butylperoxy)hexane (Kayahexa AD, manufactured by Kayaku Noury Co., Ltd.). The preblend was subjected to melt-blending using an extruder of double screws rotating in the same direction maintained at 200° C. (C$_{1:160}$° C., C$_2$ 180° C., C$_3$ to C$_8$ and D: 200° C.) (PCM-45, manufactured by Ikegai Corp.) at a screws revolution rate of 50 rpm for an average residence period of 1 min. The resulting composition was dried and then injectionmolded. The thus molded product was subjected to measurement of physical properties. The results are shown in Table 1. It is seen from the results that the product had an excellent peel strength and a good bending modulus.

COMPARATIVE EXAMPLE 1

A molded product was obtained in the same manner as in Example 1, except that the weight ratio of the polypropylene/the ethylene-propylene rubber/the graft copolymer was changed from 65/25/10 to 25/25/50. The molded product was subjected to the same physical tests as in Example 1. The results are shown in Table 1. This product contained a larger amount of the graft copolymer than in Example 1, and hence, the bending modulus was great but the peel strength which shows coating property was extremely small.

COMPARATIVE EXAMPLE 2

A molded product was obtained in the same manner as in Example 1, except that the weight ratio of the polypropylene/the ethylene-propylene rubber/the graft copolymer was changed from 65/25/10 to 40/50/10. The molded product was subjected to the same physical tests as in Example 1. The results are shown in Table 1. This product contained a larger amount of the ethylene-propylene rubber than in Example 1, and hence, the bending modulus was greatly reduced and the peel strength was slightly reduced.

COMPARATIVE EXAMPLE 3

A molded product was obtained in the same manner as in Example 1, except that the weight ratio of the polypropylene/the ethylene-propylene rubber/the graft copolymer was changed from 65/25/10 to 60/40/0. The molded product was subjected to the same physical tests as in Example 1. The results are shown in Table 1. This product contained no graft copolymer and hence had small bending modulus.

EXAMPLE 2

A molded product was obtained in the same manner as in Example 1, except that 65 parts by weight of a polypropylene having a melt index of 8 g/10 min and an ethylene content of about 5% by weight (Mitsui Noblen BJHH-G, manufactured by Mitsui Toatsu Chemicals, Inc.) was used as the polypropylene, 25 parts by weight of JSR EP02P was used as the ethylene-propylene rubber, and 10 parts by weight of JSR AES110 was used as the graft copolymer. The molded product was subjected to the same physical tests as in Example 1. The results are shown in Table 1. In this Example, too, an excellent peel strength and a good bending modulus were shown.

EXAMPLE 3

A molded product was obtained in the same manner as in Example 2, except that the weight ratio of the polypropylene/the ethylene-propylene rubber/the graft copolymer was changed from 65/25/10 to 50/30/20. The molded product was subjected to the same physical tests as in Example 1. The results are shown in Table 1. In this Example, too, an excellent peel strength and a good bending modulus were shown.

EXAMPLE 4

A molded product was obtained in the same manner as in Example 2, except that the weight ratio of the polypropylene/the ethylene-propylene rubber/the graft copolymer were changed from 65/25/10 to 50/25/25. The molded product was subjected to the same physical tests as in Example 1. The results are shown in Table 1. In this Example, too, an excellent peel strength and a good bending modulus were shown.

COMPARATIVE EXAMPLE 4

A molded product was obtained in the same manner as in Example 1, except that the amount of maleic anhydride was changed from 1 part by weight to 6 parts by weight. The molded product was subjected to the same physical tests as in Example 1. The results are shown in Table 1. No excellent peel strength can be obtained because of too large an amount of maleic anhydride.

COMPARATIVE EXAMPLE 5

A molded product was obtained in the same manner as in Example 1, except that the amount of Kayahexa AD was changed from 0.1 part by weight to 0.4 part by weight. The molded product was subjected to the same physical tests as in Example 1. The results are shown in Table 1. The product shows a very large reduction in bending modulus because of too large an amount of the organic peroxide.

EXAMPLE 5

A molded product was obtained in the same manner as in Example 2, except that 10 parts by weight of talc (Talc SW, manufactured by Nihon Talc K.K.) was mixed with other components. The molded product was subjected to the same physical tests as in Example 2. The results are shown in Table 1. The bending modulus was enhanced by addition of talc and the peel strength was also excellent.

EXAMPLE 6

A molded product was obtained in the same manner as in Example 5, except that the amount of maleic anhydride was changed from 1 part by weight to 2 parts by weight. The molded product was subjected to the same physical tests as in Example 1. The results are shown in Table 1. As in Example 5, an excellent peel strength and an excellent bending modulus were shown.

EXAMPLE 7

A molded product was obtained in the same manner as in Example 5, except that 1 part by weight of itaconic anhydride was substituted for the 1 part by weight of maleic anhydride and the amount of Kayahexa AD was increased from 0.1 part by weight to 0.15 part by weight. The molded product was subjected to the same physical tests as in Example 1. The results are shown in Table 1. As in Examples 5 and 6, an excellent peel strength and an excellent bending modulus were shown.

EXAMPLE 8

A molded product was obtained in the same manner as in Example 1, except that 30 parts by weight of JSR EP11 (ethylene-propylene copolymer rubber having a Mooney viscosity ($ML_{1+4}$, 100° C.) of 40 and a propylene content of 49% by weight) was used as the ethylene-propylene rubber in place of the 30 parts by weight of JSR EP02P and that the polypropylene and JSR EP11 were melt-blended in advance. The molded product was subjected to the same physical tests as in Example 1. The results are shown in Table 1. An excellent peel strength and a good bending modulus were shown.

COMPARATIVE EXAMPLE 6

A molded product was obtained in the same manner as in Example 1, except that 10 parts by weight of a styrene-acrylonitrile-grafted polybutadiene (JSR ABS10 (melt flow rate (220° C., 10 kg)=10 g/10 min; specific gravity=1.03), manufactured by Japan Synthetic Rubber Co., Ltd.) was used as the graft copolymer in place of the 10 parts by weight of JSR AES110. The molded product was subjected to the same physical tests as in Example 1. The results are shown in Table 1. Use of ABS as the graft copolymer resulted in a remarkable reduction of peel strength.

COMPARATIVE EXAMPLE 7

A molded product was obtained in the same manner as in Example 1, except that 10 parts by weight of a styrene-methyl methacrylate-grafted styrene-butadiene rubber (JSR MBS67, manufactured by Japan Synthetic Rubber Co., Ltd.) was used as the graft copolymer in place of the 10 parts by weight of JSR AES110. The molded product was subjected to the same physical tests as in Example 1. The results are shown in Table 1. Use of MBS as the graft copolymer resulted in a remarkable reduction of peel strength.

TABLE 1

| Components (parts by weight) | Example 1 | Comparative Example 1 | Comparative Example 2 | Comparative Example 3 | Example 2 | Example 3 | Example 4 |
|---|---|---|---|---|---|---|---|
| PP-1 | 60 | 25 | 40 | 60 | — | — | — |
| PP-2 | — | — | — | — | 65 | 50 | 50 |
| JSR EP02P | 30 | 25 | 50 | 40 | 25 | 30 | 25 |
| JSR EP11 | — | — | — | — | — | — | — |
| JSR AES110 | 10 | 50 | 10 | 0 | 10 | 20 | 25 |
| JSR ABS10 | — | — | — | — | — | — | — |
| JSR MBS67 | — | — | — | — | — | — | — |
| Talc | — | — | — | — | — | — | — |
| Maleic anhydride | 1 | 1 | 1 | 1 | 1 | 1 | 1 |
| Itaconic anhydride | — | — | — | — | — | — | — |
| Kayahexa AD | 0.1 | 0.1 | 0.1 | 0.1 | 0.1 | 0.1 | 0.1 |
| Peel strength (g/cm) | 1000 | 300 | 560 | 850 | 1050 | 780 | 750 |
| Bending modulus (kgf/cm$^2$) | 4870 | 6820 | 3250 | 3600 | 5020 | 5060 | 5300 |

| Components (parts by weight) | Comparative Example 4 | Comparative Example 5 | Example 5 | Example 6 | Example 7 | Example 8 | Comparative Example 6 | Comparative Example 7 |
|---|---|---|---|---|---|---|---|---|
| PP-1 | 60 | 60 | — | — | — | 60 | 60 | 60 |
| PP-2 | — | — | 65 | 65 | 65 | — | — | — |
| JSR EP02P | 30 | 30 | 25 | 25 | 25 | — | 30 | 30 |
| JSR EP11 | — | — | — | — | — | 30 | — | — |
| JSR AES110 | 10 | 10 | 10 | 10 | 10 | 10 | — | — |
| JSR ABS10 | — | — | — | — | — | — | 10 | — |
| JSR MBS67 | — | — | — | — | — | — | — | 10 |
| Talc | — | — | 10 | 10 | 10 | — | — | — |
| Maleic anhydride | 6 | 1 | 1 | 2 | — | 1 | 1 | 1 |
| Itaconic anhydride | — | — | — | — | 1 | — | — | — |
| Kayahexa AD | 0.1 | 0.1 | 0.1 | 0.1 | 0.15 | 0.1 | 0.1 | 0.1 |
| Peel strength (g/cm) | 500 | 1100 | 1000 | 1050 | 950 | 980 | 370 | 380 |
| Bending modulus (kgf/cm$^2$) | 4770 | 2950 | 6370 | 6350 | 5800 | 4920 | 5130 | 4370 |

Note:
PP-1 ... Noblen BC-4
PP-2 ... Mitsui Noblen BJHH-G
Talc ... Talc SW

What is claimed is:

1. A thermoplastic resin composition obtainable by blending 100 parts by weight of a mixture consisting of
   (A) 75 to 40% by weight of a propylene polymer,
   (B) 20 to 40% by weight of an ethylene-alpha-olefin copolymer, and (C) 5 to 30% by weight of a graft copolymer obtained by copolymerizing an aromatic vinyl compound and a polar vinyl compound in the presence of an ethylene-alpha-olefin copolymer with (D) 0.1 to 5 parts by weight of an unsaturated dicarboxylic acid, an anhydride thereof or a mixture of the two, and (E) 0.01 to 0.3 part by weight of an organic radical-generating agent, and then subjecting the resulting blend to thermal treatment.

2. A thermoplastic resin composition according to claim 1, wherein the thermal treatment is conducted at 170° to 300° C.

3. A thermoplastic resin composition according to claim 1, wherein the thermal treatment is conducted at 180° to 250° C.

4. A thermoplastic resin composition according to claim 2, wherein the thermal treatment is conducted for 0.2 to 30 minutes.

5. A thermoplastic resin composition according to claim 3, wherein the thermal treatment is conducted for 0.5 to 20 minutes.

6. A thermoplastic resin composition according to claim 1, wherein the unsaturated dicarboxylic acid, its anhydride or a mixture of the two (D) is at least one member selected from the group consisting of maleic acid, itaconic acid, citraconic acid, nadic acid, maleic anhydride, itaconic anhydride, citraconic anhydride and nadic anhydride.

7. A thermoplastic resin composition according to claim 1, wherein the unsaturated dicarboxylic acid, its anhydride or a mixture of the two (D) is maleic anhydride.

8. A thermoplastic resin composition according to claim 1, wherein the organic radical-generating agent (E) is at least one member selected from the group consusting of 2,5-dimethyl-2,5-di(t-butylperoxy)hexyne-3, 2,5-dimethyl-2,5-di(t-butylperoxy)hexane, 1,3-bis(t-butylperoxyisopropyl)benzene, 2,2-bis(t-butylperoxy)-p-diisopropylbenzene, dicumyl peroxide, di-t-butyl peroxide, t-butyl benzoate, 1,1-bis(t-butylperoxy)-3,3,5-trimethylcyclohexane, 2,4-dichlorobenzoyl peroxide, benzoyl peroxide and azobisisobutyronitrile.

9. A thermoplastic resin composition according to claim 1, wherein the organic radical-generating agent (E) is at least one member selected from the group consisting of 2,5-dimethyl-2,5-di(t-butylperoxy)hexane, 1,3-bis(t-butylperoxyisopropyl)benzene and 2,2-bis(t-butylperoxy)-p-diisopropylbenzene.

10. A thermoplastic resin composition according to claim 1, wherein the mixture consists of 70 to 50% by weight of the propylene polymer (A), 25 to 35% by weight of the ethylene-alpha-olefin copolymer (B) and 10 to 25% by weight of the graft copolymer (C).

11. A thermoplastic resin composition according to claim 10, wherein 100 parts by weight of the mixture, 0.5 to 3 parts by weight of the unsaturated dicarboxylic acid, its anhydride or a mixture of the two (D) and 0.05 to 0.2 part by weight of the organic radical-generating agent (E) are subjected to thermal treatment.

12. A thermoplastic resin composition according to claim 1, wherein the ethylene-alpha-olefin copolymer (B) is a copolymer consisting of 20 to 80% by weight of ethylene and 80 to 20% by weight of at least one $C_{3-12}$ alpha-olefin.

13. A thermoplastic resin composition according to claim 1, wherein the graft copolymer (C) is obtained by subjecting at least one aromatic vinyl compound and at least one polar vinyl compound to graft polymerization in the presence of an ethylene-propylene copolymer or an ethylene-propylene-non-conjugated diene copolymer.

14. A thermoplastic resin composition according to claim 13, wherein the aromatic vinyl compound is selected from the group consisting of styrene, alpha-methylstyrene and ring-substituted styrenes, and the polar vinyl compound is selected from the group consisting of acrylonitrile, its derivatives, methacrylic acid, methacrylic acid esters, acrylic acid, acrylic acid esters, acrylamide, methacrylamide, vinyl ethers, vinyl ketones, vinylpyridine and vinyl esters.

15. A thermoplastic resin composition according to claim 13, wherein the aromatic vinyl compound is styrene, the polar vinyl compound is acrylonitrile, and the weight ratio of styrene/acrylonitrile is 80-60/20-40.

* * * * *